United States Patent
Kim et al.

(10) Patent No.: US 12,202,367 B2
(45) Date of Patent: Jan. 21, 2025

(54) CHARGING INTEGRATED CONTROLLER WITH MULTIPLE INLETS AND CHARGING INTEGRATED CONTROL METHOD USING THE SAME

(71) Applicants: Hyundai Motor Company, Seoul (KR); Kia Corporation, Seoul (KR)

(72) Inventors: Seungwoo Kim, Anyang-si (KR); Daehyun Kim, Bucheon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 552 days.

(21) Appl. No.: 17/581,082

(22) Filed: Jan. 21, 2022

(65) Prior Publication Data

US 2023/0070814 A1    Mar. 9, 2023

(30) Foreign Application Priority Data

Sep. 6, 2021  (KR) .................. 10-2021-0118634

(51) Int. Cl.
  *B60L 53/60* (2019.01)
  *B60L 53/16* (2019.01)
  *B60L 53/30* (2019.01)
  *H01M 10/44* (2006.01)

(52) U.S. Cl.
  CPC .............. *B60L 53/60* (2019.02); *B60L 53/16* (2019.02); *B60L 53/305* (2019.02); *H01M 10/44* (2013.01)

(58) Field of Classification Search
  CPC ........ B60L 53/30; B60L 53/305; B60L 53/16; H01M 10/44
  USPC .......................................................... 320/132
  See application file for complete search history.

(56) References Cited

U.S. PATENT DOCUMENTS

| 2020/0047637 A1* | 2/2020 | Nakao | ................. H04B 5/79 |
| 2020/0070675 A1* | 3/2020 | Kim | ................. B60L 53/67 |

FOREIGN PATENT DOCUMENTS

JP            5524019 B2     6/2014

* cited by examiner

*Primary Examiner* — Nathaniel R Pelton
(74) *Attorney, Agent, or Firm* — Slater Matsil, LLP (57) ABSTRACT

An embodiment charging integrated controller includes a plurality of inlets respectively engaged with a plurality of chargers by a charging coupler, a plurality of controllers, wherein each of the plurality of controllers is configured to determine a communication frequency occupied band of one inlet among the plurality of inlets based on a communication frequency occupied band of another inlet among the plurality of inlets, and a plurality of communication circuits configured to exchange information about a charging entry step of charging a high-voltage battery device through frequencies determined by the plurality of controllers.

12 Claims, 10 Drawing Sheets

CHARGING INTEGRATED CONTROLLER WITH MULTIPLE INLETS AND CHARGING INTEGRATED CONTROL METHOD USING THE SAME

CROSS-REFERENCE TO RELATED APPLICATIONS

This application claims the benefit of Korean Patent Application No. 10-2021-0118634, filed on Sep. 6, 2021, which application is hereby incorporated herein by reference.

TECHNICAL FIELD

The present disclosure relates to a charging integrated controller with multiple inlets and a charging integrated control method using the same.

BACKGROUND

Recently, the development of electric vehicle (EV) technology as an alternative power source for an internal combustion engine, which is a traditional method as a vehicle power source, has been actively discussed. An EV drives a motor by using electrical energy stored in a battery.

A vehicle that uses only the driving force of the motor as the vehicle power source is called the EV, and the EV may include an inlet for charging a battery. A charging control unit may be in charge of power line communication (PLC) between a vehicle and a charger. In general, in the case of a passenger vehicle, one inlet and one charging control unit per vehicle are applied. In addition, in the case of a commercial vehicle, two or more inlets and two or more charging control units respectively corresponding to the inlets per vehicle may be applied.

As described above, because in a vehicle including two or more inlets, charging control units do not communicate with each other, a situation in which a charger signal is not received may occur due to a control pilot (CP) line signal interference between the charging control units. Also, the charging control units are incapable of recognizing a charging state of other inlets, which may cause a problem in that it is difficult to identify a use intention of a user.

The above information disclosed in this Background section is only for enhancement of understanding of the background of the invention, and therefore it may contain information that does not form the prior art that is already known to a person of ordinary skill in the art.

SUMMARY

Embodiments of the present invention provide a charging integrated controller with multiple inlets and a charging integrated control method using the same, having advantages of enabling a plurality of control units connected to a plurality of inlets respectively to recognize charging states of the other inlets when charging a battery of a vehicle including the plurality of inlets, thereby preventing signal interference between the plurality of control units when charging the vehicle battery through a plurality of chargers.

The problems to be solved by embodiments of the present invention are not limited to those mentioned above, and other problems that are not mentioned will be clearly understood by those skilled in the art from the following description.

An exemplary embodiment of the present invention provides a charging integrated controller including a plurality of inlets respectively engaged with a plurality of chargers by a charging coupler, a plurality of control units, wherein each of the plurality of control units determines a communication frequency occupied band of one inlet among the plurality of inlets based on a communication frequency occupied band of the other inlet among the plurality of inlets, and a plurality of communication circuits configured to exchange information about a charging entry step of charging a high-voltage battery device through frequencies determined by the plurality of control units.

Each of the plurality of control units may be configured to determine a frequency band excluding the communication frequency occupied band of the other inlet as an avoidance frequency, and to determine the communication frequency occupied band of the one inlet based on the avoidance frequency.

The charging integrated controller may further include a plurality of filters configured to pass a signal of a corresponding pass band in a signal that is input to each of the plurality of control units through the plurality of inlets.

The plurality of filters may be band pass filters having a center frequency in which respective corresponding pass bands of the plurality of filters do not overlap with each other.

One of the plurality of filters may be a low-pass filter, and the other one may be a high-pass filter.

Each of the plurality of control units may be configured to determine a matching step entry timing of one charger among the plurality of chargers based on the information about the charging entry step received from another control unit matching another charger among the plurality of chargers, in matching with the one charger.

Each of the plurality of control units may be switched to one of a sleep mode and a wake mode based on a time when one inlet is engaged with one charger among the plurality of chargers by the charging coupler, a time when a lid of the one inlet is opened, and a time when charging entry steps of the remaining chargers among the plurality of chargers are switched.

Another embodiment of the present invention provides a charging integrated control method using a charging integrated controller including a plurality of inlets including engaging one inlet among the plurality of inlets with one charger among the plurality of chargers by a charging coupler, communicating, by a control unit of the one inlet, with control units of the remaining inlets among the plurality of inlets, receiving, by the control unit of the one inlet, information about a communication frequency occupied band through another inlet from a control unit of the other inlet engaged by the charging coupler, and determining a communication frequency occupied band through the one inlet based on the communication frequency occupied band through the other inlet.

The determining of the communication frequency occupied band through the one inlet may include passing, by the control unit of the one inlet, a signal of a corresponding pass band in a signal input to the control unit of the one inlet by using one filter among a plurality of filters.

The plurality of filters may be band pass filters, and the passing may include determining, by the control unit of the one inlet, a center frequency so that respective corresponding pass bands of the plurality of filters do not overlap with each other.

One of the plurality of filters may be a low-pass filter, and the other one may be a high-pass filter.

The determining of the communication frequency occupied band through the one inlet may include receiving, by the control unit of the one inlet, information about a charging entry step from the control unit of the other inlet engaged by the charging coupler, and determining a matching step entry timing of the one charger based on the information about the charging entry step of the other inlet.

Yet another embodiment of the present invention provides a charging integrated control method using a charging integrated controller including a plurality of inlets including switching a control unit of one inlet among the plurality of inlets to a wake state when a lid is opened, receiving, by the control unit of the one inlet, information about a charging entry step from control units of the remaining inlets among the plurality of inlets, and switching the control unit of the one inlet to a sleep state based on a first timing at which a first charger corresponding to the remaining inlets is engaged and a second timing at which charging of a high-voltage battery device by the first charger occurs.

The switching of the control unit of the one inlet to the sleep state may include switching the control unit of the one inlet to the sleep state if a charger is not engaged with the one inlet within a predetermined period of time with respect to the first timing.

The switching of the control unit of the one inlet to the sleep state may include switching the control unit of the one inlet to the sleep state if a charger is not engaged with the one inlet within a predetermined period of time with respect to the second timing.

The switching of the control unit of the one inlet to the sleep state may include switching the control unit of the one inlet to the sleep state if charging of the high-voltage battery device is not started after a second charger is engaged with the one inlet within a predetermined period of time with respect to the first timing.

The switching of the control unit of the one inlet to the sleep state may include switching the control unit of the one inlet to the sleep state if charging of the high-voltage battery device is not started after a second charger is engaged with the one inlet within a predetermined period of time with respect to the second timing.

Embodiments of the present invention may enable a plurality of control units connected to a plurality of inlets respectively to communicate with other charging control units so that the plurality of control units may recognize charging states of the other inlets when charging a battery of a vehicle including the plurality of inlets, thereby preventing signal interference between the plurality of control units when charging the vehicle battery through a plurality of chargers.

In addition, embodiments of the present invention may reduce the number of controllers through the charging integrated controller, thereby reducing material costs, improving layout, and enhancing convenience in the management of parts. In addition, embodiments of the present invention may identify the use intention of a user by implementing communication between the control units, thereby implementing an active sleep state to be controlled.

Effects of embodiments of the present invention are not limited to those mentioned above, and other effects not mentioned will be clearly understood by those skilled in the art from the following description.

The following elements may be used in connection with the drawings to describe embodiments of the present invention.

100: charging integrated controller
111: inlet
112: communication circuit
110: control unit
120: high-voltage battery device
121: BMS
130: filter
140: lid
200: charger
201: connector
202: communication circuit

DETAILED DESCRIPTION OF ILLUSTRATIVE EMBODIMENTS

A charging integrated controller that enables a high-voltage battery device to be charged by power supplied from a plurality of chargers connected to a plurality of inlets respectively will be described. The charging integrated controller may determine a communication frequency occupied band of a charger through a communication frequency occupied band of another charger to which a charging coupler is engaged.

Hereinafter, referring to the drawings, the exemplary embodiments disclosed in this specification will be described in detail, but the same or similar reference numerals are given to the same or similar constituent elements, and redundant descriptions thereof will be omitted. The suffixes "module" and/or "-portion" for the constituent element used in the following description are given or mixed in consideration of only the ease of drafting the specification, and do not have meanings or functions distinguished from each other by themselves. In addition, in describing the exemplary embodiments disclosed in this specification, when it is determined that a detailed description of a related known technology may obscure the gist of the exemplary embodiments disclosed in this specification, the detailed description thereof will be omitted. In addition, the attached drawings are only for easy understanding of the exemplary embodiments disclosed in this specification, the technical ideas disclosed in this specification is not limited by the attached drawings, and it should be understood to include all modifications, equivalents and substitutes included in the spirit and scope of the present invention.

The terms including ordinal numbers such as first, second, etc. may be used to describe various constituent elements, but the constituent elements are not limited by the terms. The terms are used only for the purpose of distinguishing one constituent element from another constituent element.

In the present application, the terms such as "comprise" or "have" are intended to designate the presence of a feature, number, step, operation, constituent element, part, or combinations thereof described in the specification, and it should be understood that the terms do not preclude in advance the possibility of the presence or addition of one or more other features, numbers, steps, operations, constituent elements, parts or combinations thereof.

A program implemented as a set of instructions embodying a control algorithm required to control another configuration may be installed in a configuration for controlling another configuration under a specific control condition among configurations according to an exemplary embodiment. The control configuration may process input data and stored data according to the installed program to generate output data. The control configuration may include a non-volatile memory storing a program and a memory storing data.

A charging integrated controller 100 and a charging integrated control method using the same according to an exemplary embodiment may integrally control a frequency at which charging states may be exchanged with each other when the charging integrated controller 100 utilizes a plurality of inlets 111_1 to 111_n to charge a high-voltage battery device 120 from a plurality of chargers 200_1 to 200_n. Here, the charging integrated controller 100 and the high-voltage battery device 120 may be included in a vehicle. Here, the vehicle may be an electric vehicle (EV).

Figure 1:
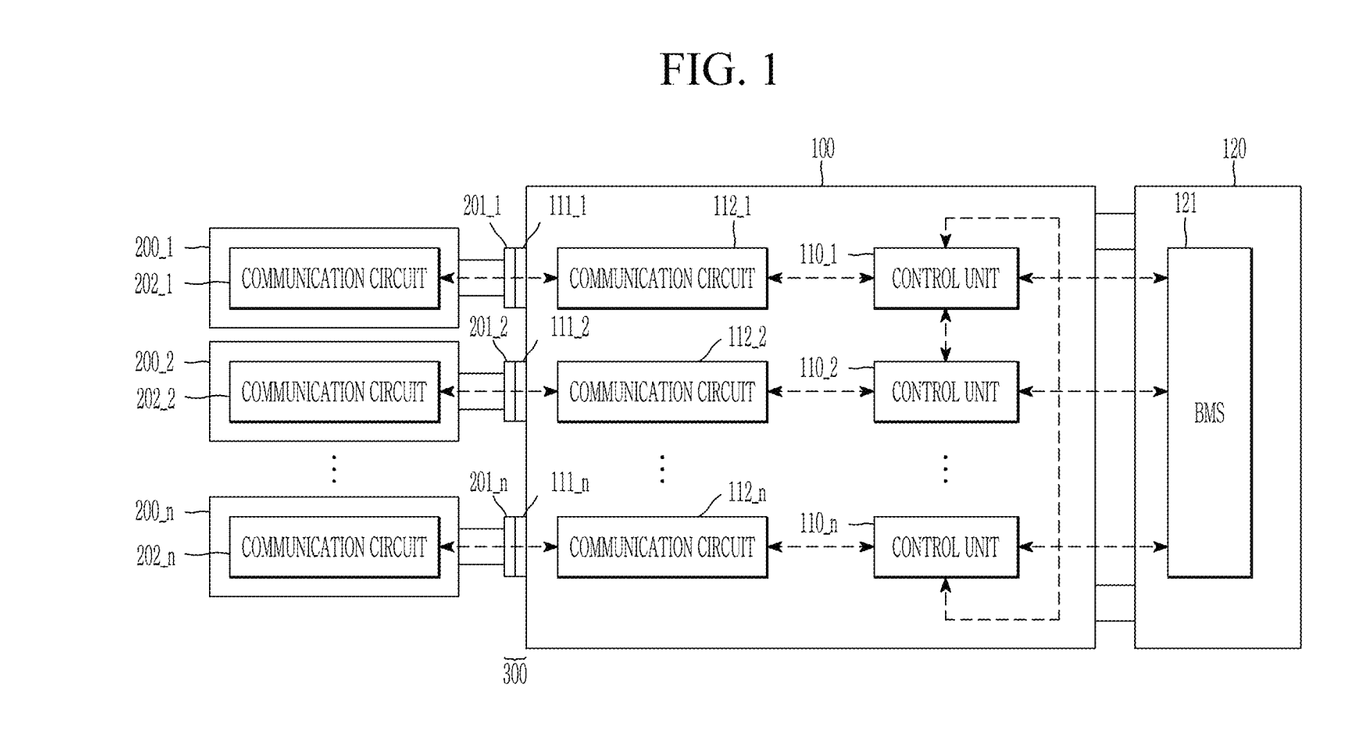
FIG. 1 is a block diagram schematically illustrating that a charging integrated controller is connected to a charger and a high-voltage battery device according to an exemplary embodiment.

FIG. 1 is a block diagram schematically illustrating that a charging integrated controller is connected to a charger and a high-voltage battery device according to an exemplary embodiment.

Referring to FIG. 1, the charging integrated controller 100 according to an exemplary embodiment may include a plurality of control units 110_1 to 110_n, a plurality of inlets 111_1 to 111_n, and a plurality of communication circuits 112_1 to 112_n.

The charging integrated controller 100 may be connected to a plurality of chargers 200_1 to 200_n through the plurality of inlets 111_i to 111_n to transmit power to the high-voltage battery device 120.

The plurality of control units 110_1 to 110_n may correspond to the plurality of inlets 111_1 to 111_n, respectively.

The plurality of control units 110_1 to 110_n may communicate with a battery management system (BMS) 121. The BMS 121 may be included in the high-voltage battery device 120.

Hereinafter, when common operation and technical characteristics of the plurality of control units 110_1 to 110_n are described, the plurality of control units 110_1 to 110_n will be referred to as a control unit 110. A control unit specified to describe the charging integrated controller 100 among the plurality of control units 110_1 to 110_n is indicated as a control unit 110_i. Among the plurality of control units 110_1 to 110_n, the control units other than the control unit 110_i are indicated as the remaining control units.

Hereinafter, when common operation and technical characteristics of the plurality of inlets 111_1 to 111_n are described, the plurality of inlets 111_1 to 111_n will be referred to as an inlet 111. An inlet specified to describe the charging integrated controller 100 among the plurality of inlets 111_1 to 111_n is indicated as an inlet 111_i. Among the plurality of inlets 111_1 to 111_n, the inlets other than the inlet 111i are indicated as the remaining inlets.

Hereinafter, when common operation and technical characteristics of the plurality of communication circuits 112_1 to 112_n of the charging integrated controller 100 are described, the plurality of communication circuits 112_1 to 112_n will be referred to as a communication circuit 112.

Hereinafter, when common operation and technical characteristics of the plurality of chargers 200_1 to 200_n are described, the plurality of chargers 200_1 to 200_n will be referred to as a charger 200. A charger specified to describe the charging integrated controller 100 among the plurality of chargers 200_1 to 200_n is indicated as a charger 200_i. Among the plurality of chargers 200_1 to 200_n, the chargers other than the charger 200_i are indicated as the remaining chargers.

Hereinafter, when common operation and technical characteristics of the plurality of connectors 201_1 to 201_n are described, the plurality of connectors 201_1 to 201_n will be referred to as a connector 201. A connector specified to describe the charging integrated controller 100 among the plurality of connectors 201_1 to 201_n is indicated as a connector 201_i. Among the plurality of connectors 201_1 to 201_n, the connectors other than the connector 201_i are indicated as the remaining connectors.

The plurality of chargers 200_1 to 200_n may respectively include a plurality of communication circuits 202_1 to 202_n. Hereinafter, when common operation and technical characteristics of the plurality of communication circuits 202_1 to 202_n of the charger 200 are described, the plurality of communication circuits 202_1 to 202_n will be referred to as a communication circuit 202.

Each of a communication circuit 112 and a communication circuit 202 may include a PHY chip. The PHY chip may be designed to perform PLC communication adopted by the standard of physical/data link layer requirements according to ISO/IEC15118-3. PHY may be a Home Plug Green PHY adopted by the standard. The PHY chip may be a chipset for network communication within a modem applied to a vehicle side and a charger side for rapid charging in electric charging.

The charger 200 may send and receive a signal regarding a charging state with the charging integrated controller 100 through a communication frequency occupied band determined by the control unit 110.

The plurality of chargers 200_1 to 200_n may be physically connected to the plurality of inlets 111_1 to 111_n through the plurality of connectors 201_1 to 201_n respectively.

Hereinafter, the inlet 111_i and the charger 200_i being engaged by a charging coupler may indicate the inlet 111_i being physically connected to the connector 201_i of the charger 200_i.

Hereinafter, an operation of the control unit 110_i of the inlet 111_i when the inlet 111_i and the charger 200_i are engaged by a charging coupler 300 will be described below. The communication circuit 112 of the charging integrated controller 100 may be represented by the communication circuit 112_i, and the communication circuit 202 of the charger 200_i may be represented by the communication circuit 202_i. In order to distinguish from them, among the remaining inlets, the remaining control units, and the remaining chargers, those with which the charging coupler is engaged earlier than the inlet 111_i may be represented by another inlet 111_j, another control unit 110_j, another charger 200_j, a communication circuit 112_j, and a communication circuit 202_j.

The control unit 110_i may transmit and receive information about the communication frequency occupied band with the other control unit 110_j to determine a communication frequency occupied band of the communication circuit 112_i. The communication frequency occupied band means a frequency band allocated between the communication circuits 112 and 202 in order for a PHY chip of the communication circuit 112 to communicate with a PHY chip of the communication circuit 202.

The BMS 121 may use a communication frequency of the occupied band determined by the control unit 110_i to control charging of the high-voltage battery device 120 by the power supplied from the charger 200_i.

A protocol for charging a vehicle battery, etc. may include various charging entry steps. The charging entry steps may include steps of engaging the inlet 111_i with the charger 200_i by the charging coupler, matching and synchronizing the charger 200_i with the charging integrated controller 100, starting charging the high-voltage battery device 120, ending charging the high-voltage battery device 120, etc. The matching step, the synchronizing step, etc. may be implemented by the disclosed technologies.

The control unit 110_i may receive information about the charging entry steps from the other control unit 110_j. The control unit 110_i may control the charging entry step with respect to the charger 200_i based on the information about the charging entry step received from the other control unit 110_j.

The control unit 110_i may receive information about the communication frequency occupied band allocated to the communication circuit 112_j of the other control unit 110_j, and avoid the received communication frequency occupied band to allocate a communication frequency band to the communication circuit 112_i of the control unit 110_i.

In addition, the charging integrated controller 100 may filter signals respectively input to the control units 110 to classify and allocate the signals, so that communication frequency bands respectively corresponding to the communication circuits 112 do not overlap each other.

Also, the control unit 110_i may be switched to either a sleep mode or a wake mode based on whether a lid of the inlet 111 is opened, whether the other inlet 111_j is engaged with the other connector 201 by the charging coupler, and what the charging entry step of the other charger 200_j is.

The high-voltage battery device 120 may include one or more high-voltage batteries. The power supplied from the charger 200 may be distributed by a bus bar to be equally transmitted to the one or more high-voltage batteries.

Hereinafter, an operation in which the control unit 110_i determines the communication frequency occupied band of the communication circuit 112_i will be described.

Figure 2:
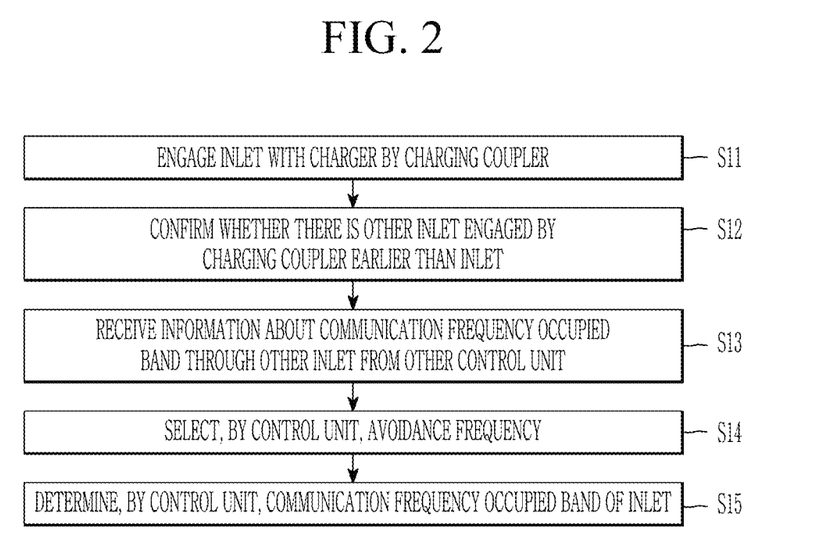
FIG. 2 is a flowchart of a charging integrated control method according to an exemplary embodiment.
Figure 3:
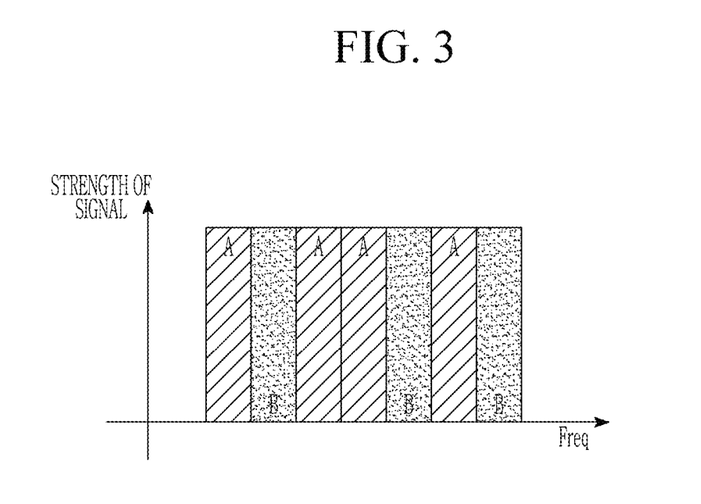
FIG. 3 is an exemplary diagram of a charging integrated control method according to an exemplary embodiment in which frequency hopping occurs.

FIG. 2 is a flowchart of a charging integrated control method according to an exemplary embodiment, and FIG. 3 is an exemplary diagram of a charging integrated control method according to an exemplary embodiment in which frequency hopping occurs.

Hereinafter, the charging integrated control method according to an exemplary embodiment will be sequentially described with reference to FIG. 2.

In FIG. 2, the inlet 111_i is engaged with the charger 200_i by a charging coupler (S11).

The control unit 110_i transmits/receives signals to/from the remaining control units to confirm whether there is the other inlet 111_j engaged by the charging coupler earlier than the inlet 111_i (S12).

Each of the plurality of control units 110_1 to 110_n may receive information about a charging entry step from the other control units, and confirm the order that the plurality of charging couplers 300 are engaged.

For example, the control unit 110_i may confirm the order that the charging couplers are engaged based on the information about the charging entry step received from the remaining control units. Accordingly, the control unit 110_i may confirm that the other inlet 111_j and the other charger 200_j are engaged by the charging coupler before the time when the inlet 111_i and the charger 200_i are engaged by the charging coupler.

If there is the other inlet 111_j engaged by the charging coupler earlier than the inlet 111_i, the control unit 110_i receives information about a communication frequency occupied band through the other inlet 111_j from the other control unit 110_j (S13).

The communication frequency occupied band received from the other control unit 110_j may be a frequency band for the communication circuit 112_j of the other inlet 111_j to communicate with the communication circuit 202_j of the other charger 200_j.

The control unit 110_i selects an avoidance frequency (S14).

The control unit 110_i may select the avoidance frequency based on the received information about the communication frequency occupied band. The avoidance frequency may be a remaining frequency band except for the communication frequency occupied band occupied by the other control unit 110_j.

The control unit 110_i determines the communication frequency occupied band of the inlet 111_i (S15).

The control unit 110_i may determine the communication frequency occupied band through the inlet 111_i based on the avoidance frequency. Accordingly, the communication frequency occupied band through the inlet 111_i may be determined not to overlap a communication frequency occupied band through the other inlet 111_j.

The BMS 121 may receive information required for charging control of the high-voltage battery device 120 from the control unit 110. The high-voltage battery device 120 may be charged with power supplied from the charger 200_i.

Also, according to an exemplary embodiment, frequency hopping may occur in a communication frequency through the other inlet 111_j. In this case, hopping may also occur in the communication frequency through the inlet 111_i. Referring to FIG. 3, when hopping occurs in a communication frequency indicated by A through the other inlet 111_j, hopping may also occur in a communication frequency indicated by B through the inlet 111_i according to the avoidance frequency.

Figure 4:
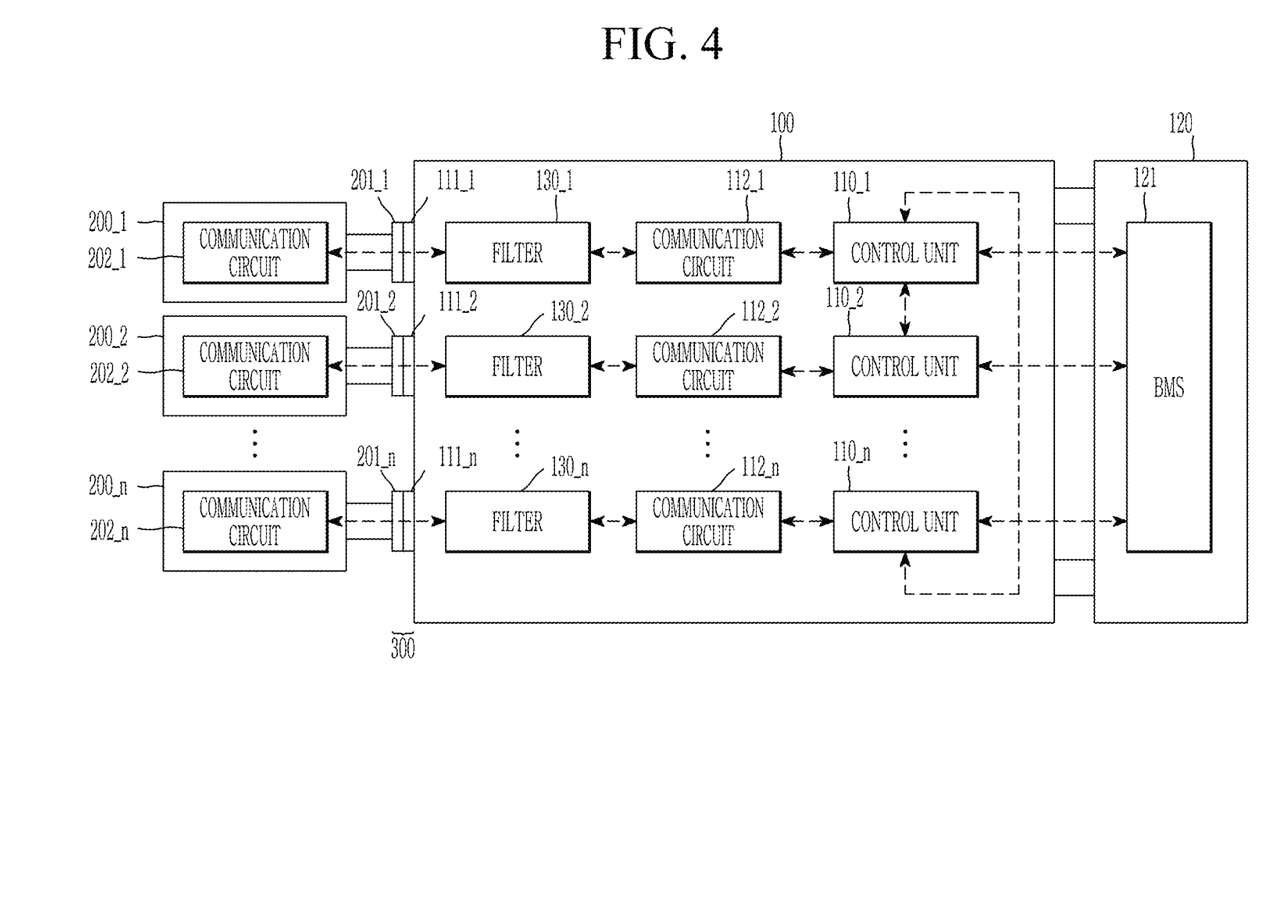
FIG. 4 is a block diagram schematically illustrating an exemplary embodiment in which a filter is included in the charging integrated controller of FIG. 1.

FIG. 4 is a block diagram schematically illustrating an exemplary embodiment in which a filter is included in the charging integrated controller of FIG. 1.

Referring to FIG. 4, the charging integrated controller 100 may include a plurality of filters 130_1 to 130_n.

Hereinafter, when common operation and technical characteristics of the plurality of filters 130_1 to 130_n are described, the plurality of filters 130_1 to 130_n are referred to as a filter 130. Also, a filter connected to the inlet 111_i may be referred to as a filter 130_i, and a filter connected to the other inlet 111_j may be referred to as another filter 130_j.

The filter 130 may be applied to a signal input terminal of the control unit 110. The filter 130 may be applied between the communication circuit 112 of the charging integrated controller 100 and the communication circuit 202 of the charger 200. Accordingly, the plurality of filters 130_1 to 130_n may filter signals that are input to the plurality of control units 110_1 to 110_n. A center frequency of the filter 130 may be variable, and frequencies used between a plurality of inlets may be exclusively filtered. In this regard, a specific frequency band may be selected through a band-pass filter. Alternatively, frequency band division may be used through a low-pass filter and a high-pass filter.

Figure 5:
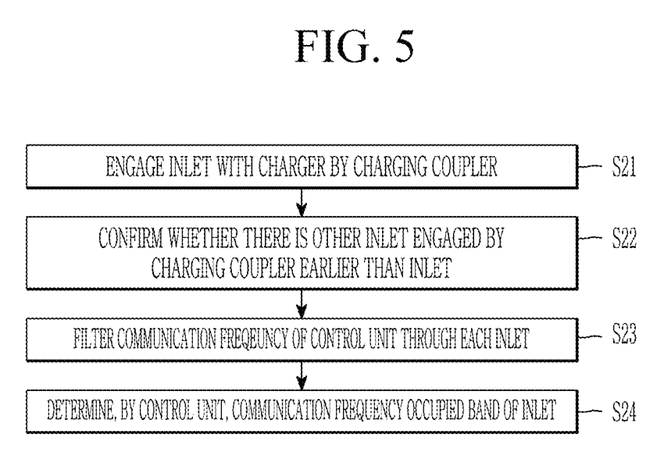
FIG. 5 is a flowchart of a charging integrated control method using a charging integrated controller including a frequency filter according to an exemplary embodiment.
Figure 6:
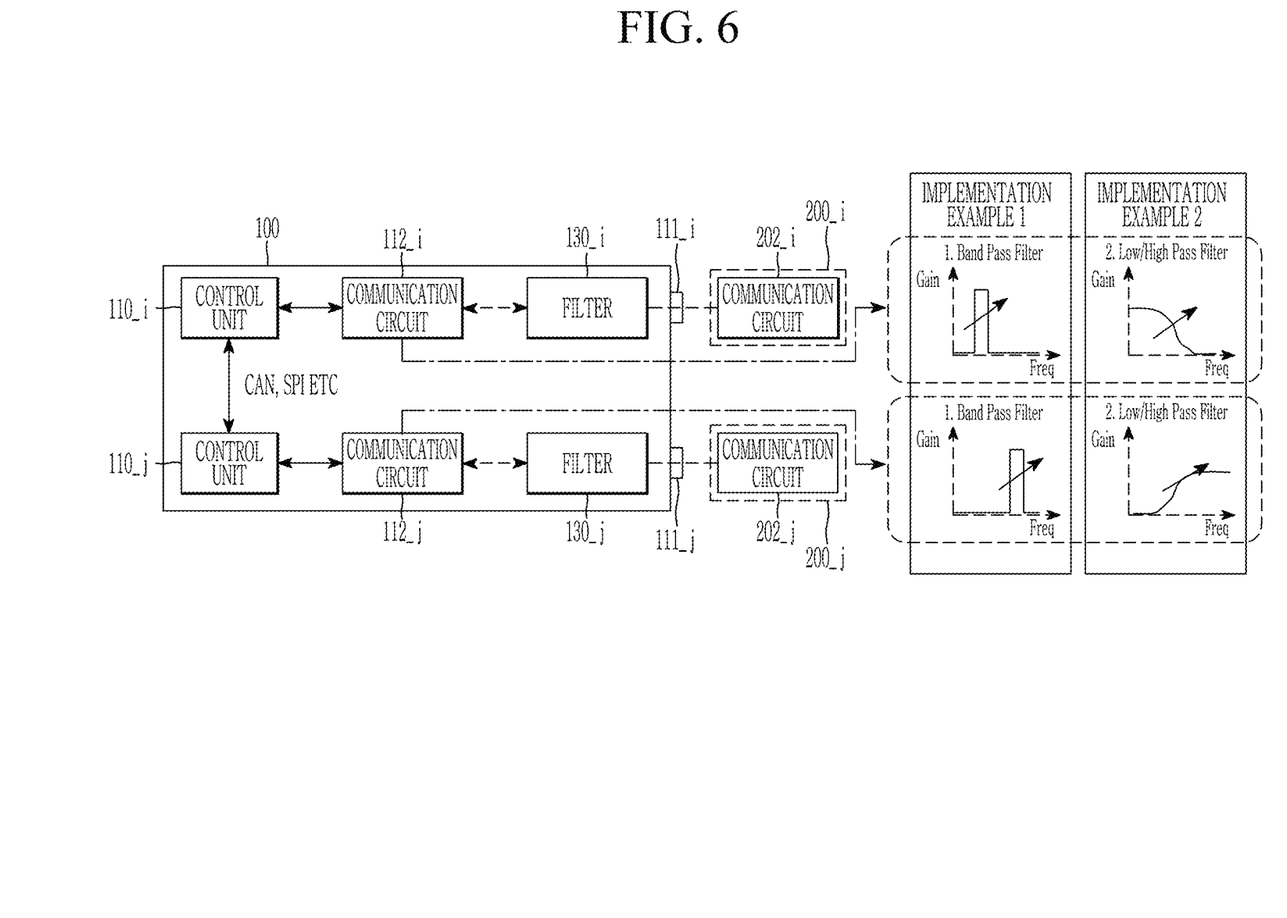
FIG. 6 is an exemplary diagram of the frequency filter of FIG. 5.

FIG. 5 is a flowchart of a charging integrated control method using a charging integrated controller including a frequency filter according to an exemplary embodiment, and FIG. 6 is an exemplary diagram of the frequency filter of FIG. 5.

In FIG. 5, steps S21 and S22 may operate in the same manner as steps S11 and S12 in FIG. 2, respectively.

Thereafter, the filter 130_i may filter a communication frequency of the control unit 110_i through each inlet 111_i (S23).

The filter 130 may perform exclusive filtering so that the communication frequency of the control unit 110_i through the remaining inlet 111_i does not overlap with communication frequencies of the remaining control units through the remaining inlets. Here, the filter 130 may be any one of a band pass filter (BPF), a low-pass filter (LPF), and a high-pass filter (HPF).

Referring to implementation example 1 of FIG. 6, the filter 130_i and the other filter 130_j may be BPSs. In this case, the control unit 110_i may determine a center frequency of the filter 130_i so that a pass band of the filter 130_i does not overlap a pass band of the other filter 130_j. In this regard, the control unit 110_i may receive information about the pass band of the other filter 130_j from the other control unit 110_j and determine the center frequency of the filter 130_i based on the information.

Also, referring to implementation example 2 of FIG. 6, the filter 130_i and the other filter 130_j may be LPFs or HPFs. The filter 130_i may be a LPF, and the other filter 130_j may be a HPF, or vice versa. In this case, the control unit 110_i may determine a cut-off frequency so that the pass band of the filter 130_i does not overlap with the pass band of the other filter 130_j.

In this regard, the control unit 110_i may receive information about a shape and pass band of the other filter 130_j from the other control unit 110_j and determine a shape and cut-off frequency of the filter 130_i based on the information. Here, the shape of the filter 130 may be any one of a BPF, a LPF, and a HPF.

In FIG. 5, step S24 may operate in the same manner as step S15 in FIG. 2.

Figure 7:
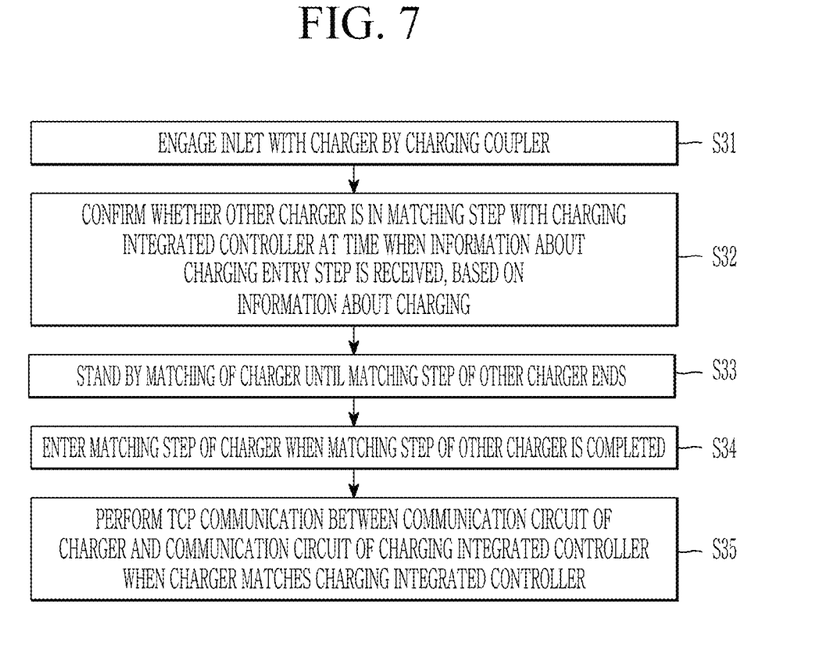
FIG. 7 is a detailed flowchart illustrating a matching step of a charging integrated control method according to an exemplary embodiment.
Figure 8:
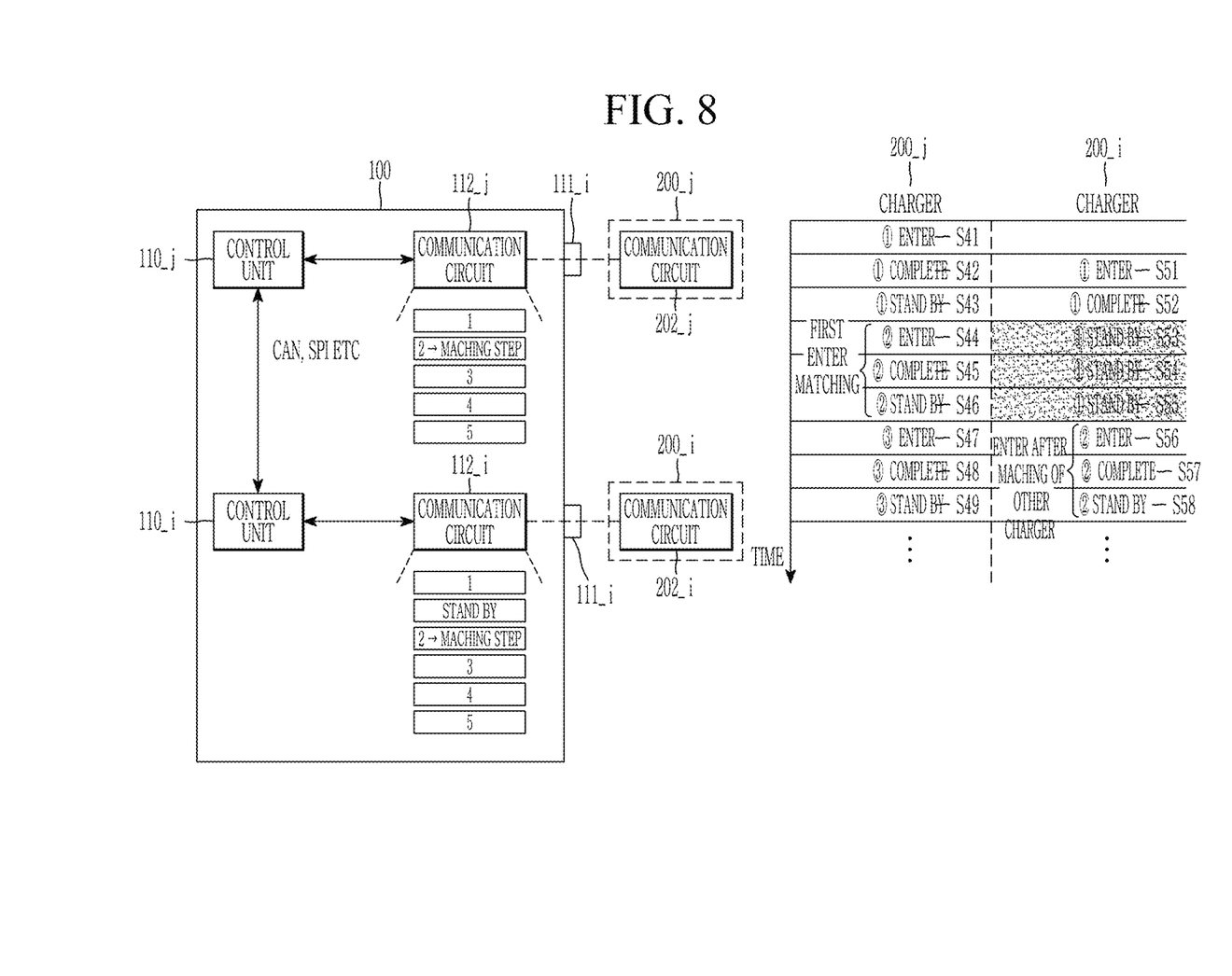
FIG. 8 is an exemplary diagram illustrating FIG. 7.

FIG. 7 is a detailed flowchart illustrating a matching step of a charging integrated control method according to an exemplary embodiment, and FIG. 8 is an exemplary diagram illustrating FIG. 7.

Steps shown in FIG. 7 relate to a detailed flowchart of steps of matching the charging integrated controller 100 and the charger 200_i with each other. The control unit 110_i may communicate with the other control unit 110_j to receive feedback of information about a charging entry step.

Hereinafter, the matching step of the charger 200_i may represent a step of matching the charger 200_i with the charging integrated controller 100 through the inlet 111_i engaged by a charging coupler.

Here, the matching step may be performed through a signal level attenuation characterization (SLAC) mechanism. The SLAC mechanism may include a step of performing matching through a signal level comparison between the charging integrated controller 100 and the charger 200.

The control unit 110_i may limit the matching step of the charger 200_i to exclusively enter the matching step of the other charger 200_j.

Referring to FIG. 7, the inlet 111_i is engaged with the charger 200_i by a charging coupler (S31).

The control unit 110_i transmits/receives signals to the remaining control units to confirm whether there is the other inlet 111_j engaged by the charging coupler earlier than the inlet 111_i. If there is the other inlet 111_j engaged by the charging coupler earlier than the inlet 111_i, the control unit 110_i receives information about the charging entry step from the other control unit 110_j.

The control unit 110_i confirms whether the other charger 200_j is in the matching step with the charging integrated controller 100 at the time when the information about the charging entry step is received, based on the information about the charging entry step received from the other control unit 110_j (S32).

When the other charger 200_j is in the matching step, the control unit 110_i stands by matching of the charger 200_i until the matching step of the other charger 200_j ends (S33). Here, the other charger 200_j may represent the charger 200 that has entered the matching step earlier than the charger 200_i.

Whether the other charger 200_j has earlier entered the matching step among the plurality of chargers 200_1-200n may be determined by comparing the magnitude of signal attenuation recognized by the communication circuit 112 of the control unit 110_i and the magnitude of signal attenuation recognized by the communication circuit 112 of the remaining control units.

When the matching step of the other charger 200_j is completed, the control unit 110_i allows the charger 200_i to enter the matching step (S34).

After the matching step of the other charger 200_j is completed, the control unit 110_i may allow the charger 200_i to enter the matching step. For example, when the SLAC step is performed, the control unit 110 may facilitate an SLAC entry by placing a chipset performing the corresponding step in a temporal monopoly situation due to the characteristic of a broadcast signal.

In FIG. 8, ① (S41 to S43 and S51 to S55) may represent specific steps before the matching step among the charging entry steps, ② (S44 to S46 and S56 to S58) may represent the matching steps, and ③ (S47 to S49) may represent specific steps after the matching step among the charging entry steps.

In the example of FIG. 8, the control unit 110_i stands by the matching step of the charger 200_i until the other charger 200_j first enters the matching step (S44) and completes (S45) (S53 to S54). The control unit 110_i controls the charger 200_i to enter the matching step (S56) when the other charger 200_j enters a specific step after the matching step (S47).

As described above, when the charger matches the charging integrated controller 100, transmission control protocol (TCP) communication between the communication circuit 202 of the charger 200 and the communication circuit 112 of the charging integrated controller 100 may be performed (S35).

After the matching step is completed, when the charger 200_i communicates with the charging integrated controller 100 through the inlet 111_i, TCP communication is performed and thus, reliable communication may be guaranteed.

Figure 9A:
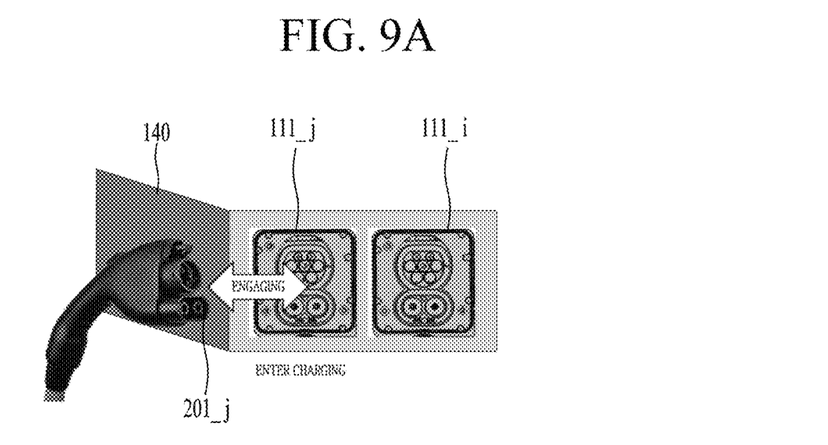
FIGS. 9A and 9B are exemplary diagrams for explaining an operation of a plurality of inlets.
Figure 9B:
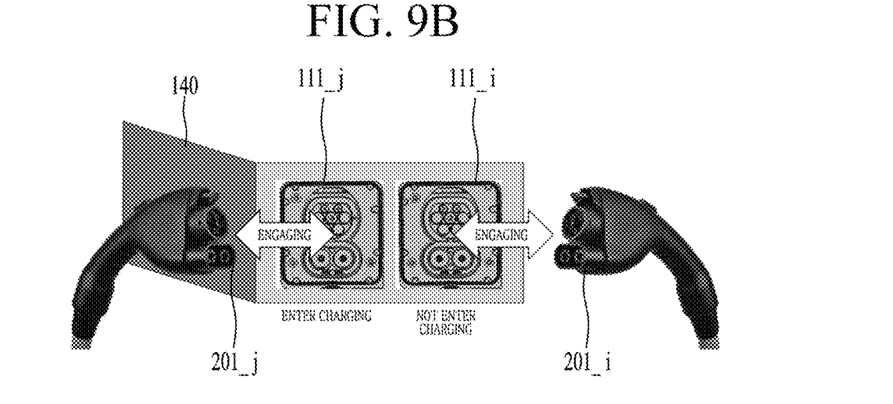
Figure 10:
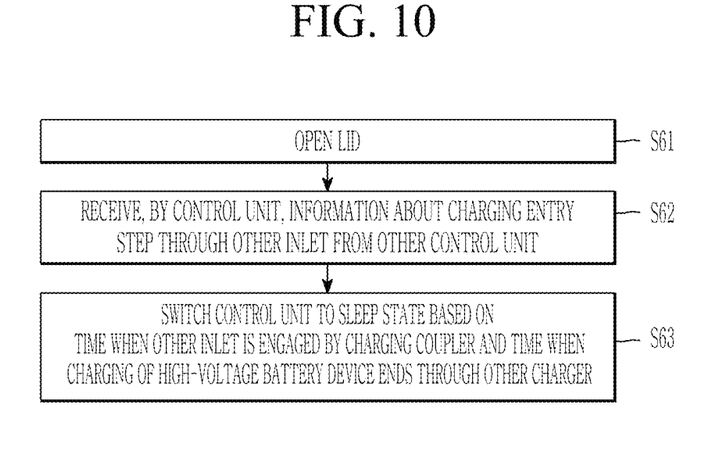
FIG. 10 is a flowchart for explaining a sleep state of a charging integrated control method according to an exemplary embodiment.

FIGS. 9A and 9B are exemplary diagrams for explaining an operation of a plurality of inlets, and FIG. 10 is a flowchart for explaining a sleep state of a charging integrated control method according to an exemplary embodiment.

In FIG. 9A, the lid 140 is opened and the connector 201_j of the other charger 200_j is engaged with the other inlet 111_j by a charging coupler and enters charging.

In FIG. 9B, the lid 140 is opened and the connector 201_j of the other charger 200_j is engaged with the other inlet 111_j by a charging coupler and enters charging, and the connector 201_i of the charger 200_i is engaged with the inlet 111_i and does not enter charging.

An exemplary embodiment relating to the sleep state of the control unit 110 through communication between the control units 110 will be described with reference to FIGS. 9A and 9B.

The lid 140 may represent a cover that covers one or more inlets 111 included in a vehicle. When the inlet 111 is not engaged with the charger 200 by the charging coupler 300, the control unit 110 may be in the sleep state. In the sleep state, the control unit 110 does not operate.

When the lid 140 is opened, the control unit 110 may be switched to a wake-up state and stand by charging of the high-voltage battery device 120 through the charger 200.

In an exemplary embodiment, if the inlet 111 is not engaged with the charger 200 by the charging coupler 300 within a predetermined period of time after the lid 140 is opened, the control unit 110 may return to the sleep state. In FIG. 9A, if one of the other connectors 201 is not connected to the inlet 111_i for a predetermined period of time, the control unit 110 of the inlet 111_i may return to the sleep state.

Also, in an exemplary embodiment, if the inlet in does not start charging within a predetermined period of time after the inlet 111 is engaged with the charger 200 by the charging coupler 300, the control unit 110 may return to the sleep state. In FIG. 9B, if charging through the inlet 111_i is not started for a predetermined period of time, the control unit 110_i of the inlet 111_i may return to the sleep state.

Also, in an exemplary embodiment, the control unit 110 may determine whether to return to the sleep state in consideration of a state of charging through the remaining inlets.

Referring to FIG. 10, after the lid 140 is opened (S61), the control unit 110_i may receive information about a charging entry step through the other inlet 111_j from the other control unit 110_j (S62).

Here, when the lid 140 is opened, the control unit 110 may be switched to the wake-up state and stand by charging of the high-voltage battery device 120 through the charger 200.

The control unit 110_i may be switched to the sleep state based on a time when the other inlet 111_j is engaged by the charging coupler and a time when charging of the high-voltage battery device 120 by the other charger 200_j ends (S63).

First, when the inlet 111_i is not engaged by the charging coupler, the control unit 110_i may be switched to the sleep state (FIG. 9A).

For example, if charging through the other charger 200_j is not started, and the inlet 111_i is not engaged by the charging coupler within a predetermined period of time with respect to the time when the other inlet 111_j is engaged by the charging coupler, the control unit 110_i may be switched to the sleep state.

In addition, if the inlet 111_i is not engaged by the charging coupler within a predetermined period of time with respect to the time when the other inlet 111_j is engaged by the charging coupler and charging of the high-voltage battery device 120 through the other charger 200_j ends, the control unit 110_i may be switched to the sleep state.

Next, when the inlet 111_i is engaged with the charger 200_i by the charging coupler, the control unit 110_i may be switched to the sleep state (FIG. 9B).

For example, if charging through the charger 200_i and the other charger 200_j is not started within a predetermined period of time with respect to the time when the other inlet 111_j is engaged by the charging coupler, the control unit 110_i may be switched to the sleep state.

In addition, if charging through the charger 200_i is not started within a predetermined period of time with respect to the time when the other inlet 111_j is engaged by the charging coupler and charging of the high-voltage battery device 120 through the other charger 200_j ends, the control unit 110_i may be switched to the sleep state.

In relation to a transition between the sleep state and the wake-up state of the control unit 110, a charging warning light attached to the inside or outside of a vehicle including the charging integrated controller 100 may be turned on or off. For example, in the wake-up state, the charging warning light may be turned on. Also, in the sleep state, the charging warning light may be turned off.

As such, in the wake-up state, power may be consumed to turn on the charging warning light and stand by for charging. Accordingly, if the wake-up state continues, a problem such as discharging of a low-voltage battery device due to excessive power consumption may occur. A problem such as inability to start a vehicle may be caused by discharging of the low-voltage battery device. In order to overcome such problems, each control unit 110_i may communicate with the remaining control units to control whether to return to a sleep mode according to charging states of the remaining inlets.

Here, the predetermined period of time may be previously determined as initial information.

In embodiments of the present specification, communication of the control unit 110_i with the other control unit 110_j may be performed through any one or more of network communication, PLC communication, CAN communication, and SPI communication.

If communication between the control units 110 is not implemented, in charging the high-voltage battery device 120 with power supplied from the plurality of chargers 200_1 to 200_n, interference between signals capable of transmitting and receiving a charging state between each charger 200 and each control unit 110 may occur. Accordingly, such an interference between signals may be improved by enabling communication between the control units 110.

While exemplary embodiments of the present invention have been described in detail above, the scope of the present invention is not limited thereto, and various modifications and improvements by those of ordinary skill in the art to which the present invention pertains also belong to the scope of the present invention.

What is claimed is:

1. A charging integrated controller comprising:
   a plurality of inlets respectively engaged with a plurality of chargers by a charging coupler;

a plurality of controllers, wherein each of the plurality of controllers is configured to determine a communication frequency occupied band of one inlet among the plurality of inlets based on a communication frequency occupied band of another inlet among the plurality of inlets; and a plurality of communication circuits configured to exchange information about a charging entry step of charging a high-voltage battery device through frequencies determined by the plurality of controllers.

2. The charging integrated controller of claim 1, wherein each of the plurality of controllers is configured to determine a frequency band excluding the communication frequency occupied band of the other inlet as an avoidance frequency, and to determine the communication frequency occupied band of the one inlet based on the avoidance frequency.

3. The charging integrated controller of claim 1, further comprising a plurality of filters configured to pass a signal of a corresponding pass band in a signal that is input to each of the plurality of controllers through the plurality of inlets.

4. The charging integrated controller of claim 3, wherein the plurality of filters comprises band pass filters having a center frequency in which respective corresponding pass bands of the plurality of filters do not overlap with each other.

5. The charging integrated controller of claim 3, wherein one of the plurality of filters is a low-pass filter, and another of the plurality of filters is a high-pass filter.

6. The charging integrated controller of claim 1, wherein each of the plurality of controllers is configured to determine a matching step entry timing of one charger among the plurality of chargers based on the information about a charging entry step received from another controller matching another charger among the plurality of chargers, in matching with the one charger.

7. The charging integrated controller of claim 1, wherein each of the plurality of controllers is configured to be switched to one of a sleep mode and a wake mode based on a time when one inlet is engaged with one charger among the plurality of chargers by the charging coupler, a time when a lid of the one inlet is opened, and a time when charging entry steps of remaining chargers among the plurality of chargers are switched.

8. A charging integrated control method using a charging integrated controller method comprising:

engaging a first inlet among a plurality of inlets with a first charger among a plurality of chargers by a charging coupler;

communicating, by a controller of the first inlet, with controllers of remaining inlets among the plurality of inlets;

receiving, by the controller of the first inlet, information about a communication frequency occupied band through a second inlet from the controller of the second inlet engaged by the charging coupler; and determining a communication frequency occupied band through the first inlet based on the communication frequency occupied band through the second inlet.

9. The method of claim 8, wherein determining the communication frequency occupied band through the first inlet comprises passing, by the controller of the first inlet, a signal of a corresponding pass band in a signal input to the controller of the first inlet by using a first filter among a plurality of filters.

10. The method of claim 9, wherein:

each of the plurality of filters comprises a band pass filter; and passing the signal of the corresponding pass band comprises determining, by the controller of the first inlet, a center frequency so that respective corresponding pass bands of the plurality of filters do not overlap with each other.

11. The method of claim 9, wherein one of the plurality of filters is a low-pass filter and another of the plurality of filters is a high-pass filter.

12. The method of claim 8, wherein determining the communication frequency occupied band through the first inlet comprises:

receiving, by the controller of the first inlet, information about a charging entry step from the controller of the second inlet engaged by the charging coupler; and determining a matching step entry timing of the first charger based on the information about the charging entry step of the second inlet.

* * * * *